US009118955B2

(12) United States Patent
Ahn et al.

(10) Patent No.: US 9,118,955 B2
(45) Date of Patent: Aug. 25, 2015

(54) STEREO IMAGE HANDLING DEVICE AND METHOD

(75) Inventors: Sang-Jun Ahn, Seoul (KR); Gun-Ill Lee, Seoul (KR); Kwang-Cheol Choi, Gwacheon-si (KR); Jeong-Heui Cho, Ansan-si (KR); Dong-Gon Kim, Ansan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 780 days.

(21) Appl. No.: 13/376,314

(22) PCT Filed: Jun. 4, 2010

(86) PCT No.: PCT/KR2010/003605
§ 371 (c)(1),
(2), (4) Date: Dec. 5, 2011

(87) PCT Pub. No.: WO2010/140864
PCT Pub. Date: Dec. 9, 2010

(65) Prior Publication Data
US 2012/0075431 A1    Mar. 29, 2012

(30) Foreign Application Priority Data
Jun. 5, 2009  (KR) ................. 10-2009-0049746

(51) Int. Cl.
*H04N 13/02*      (2006.01)
*G06K 9/00*       (2006.01)
(Continued)

(52) U.S. Cl.
CPC ....... *H04N 21/4223* (2013.01); *H04N 13/0048* (2013.01); *H04N 13/0239* (2013.01); *H04N 19/597* (2014.11)

(58) Field of Classification Search
CPC .......... H04N 13/0048; H04N 21/4223; H04N 13/0239; H04N 19/00769
USPC ........................................................... 348/47
See application file for complete search history.

(56) References Cited

U.S. PATENT DOCUMENTS 5,864,342 A * 1/1999 Kajiya et al. .................. 345/418
2004/0066846 A1   4/2004 Yun et al.
(Continued)

FOREIGN PATENT DOCUMENTS

KR   20050055163       6/2005
KR   20070006228 A     1/2007
(Continued)

OTHER PUBLICATIONS

Il-Lyong Jung, et al., "Efficient Stereo Video Coding Based on Frame Skipping for Real-Time Mobile Applications", IEEE Trans. on Consumer Electronics, vol. 54, No. 3, Aug. 2008, p. 1259-1266.
(Continued)

*Primary Examiner* — Hee-Yong Kim

(57) ABSTRACT

An apparatus and a method for processing a stereo image are provided. In the method, a first image and a second image are obtained via a first camera module and a second camera module installed spaced by a predetermined distance. When the stereo image is captured, the first image and the second image are alternatively sampled with a predetermined time interval. The sampled at least one first image and the sampled at least one second image are encoded. Therefore, the stereo image can be compressed with low complexity compared to the case of compressing a stereo image using a 2D image compression technology.

19 Claims, 7 Drawing Sheets

(51) Int. Cl.
*G06F 17/00* (2006.01)
*G06T 1/00* (2006.01)
*H04N 21/4223* (2011.01)
*H04N 13/00* (2006.01)
*H04N 19/597* (2014.01)

(56) References Cited

U.S. PATENT DOCUMENTS

| | | | |
|---|---|---|---|
| 2006/0018516 A1* | 1/2006 | Masoud et al. | 382/115 |
| 2006/0268987 A1 | 11/2006 | Ha | |
| 2010/0194860 A1* | 8/2010 | Mentz et al. | 348/47 |
| 2010/0231593 A1* | 9/2010 | Zhou et al. | 345/428 |

FOREIGN PATENT DOCUMENTS

| | | |
|---|---|---|
| KR | 1020080027190 A | 3/2008 |
| WO | WO 2004/004350 | 1/2004 |

OTHER PUBLICATIONS

International Search Report dated Jan. 6, 2011 in connection with International Patent Application No. PCT/KR2010/003605.
Korean Office Action dated May 20, 2015 in connection with Korean Patent Application No. 10-2009-0049746; 10 pages.

* cited by examiner

INPUT FRAME SEQUENCE

STEREO IMAGE HANDLING DEVICE AND METHOD

CROSS-REFERENCE TO RELATED APPLICATION(S) AND CLAIM OF PRIORITY

The present application claims priority under 35 U.S.C. §365 to International Patent Application No. PCT/KR2010/003605 filed Jun. 4, 2010, entitled "STEREO IMAGE HANDLING DEVICE AND METHOD". International Patent Application No. PCT/KR2010/003605 claims priority under 35 U.S.C. §365 and/or 35 U.S.C. §119(a) to Korean Patent Application No. 10-2009-0049746 filed Jun. 5, 2009 and which are incorporated herein by reference into the present disclosure as if fully set forth herein.

TECHNICAL FIELD OF THE INVENTION

The present invention relates to an apparatus and a method for processing a stereo image. More particularly, the present invention relates to an apparatus and a method for compressing a stereo image in a stereo image processing apparatus.

BACKGROUND OF THE INVENTION

With development of an image technology, a 3 dimensional (3D) image for providing an image having a sense of reality to a user is drawing attention. For example, an image provide apparatus may obtain a 3D image using a stereo vision technology.

In case of using the stereo vision technology, the image provide apparatus synthesizes two images obtained using two camera modules to obtain a stereo image via which the user may feel a 3D effect.

Generally, a compression technology for a stereo image uses a simulcast method, a compatible method, and a joint method.

In case of using the simulcast method, an image provide apparatus separates a first image and a second image used for configuring a stereo image and encodes the same.

In case of using the compatible method, the image provide apparatus encodes a first image used for configuring a stereo image using a 2D image compression technology. After that, the image provide apparatus encodes a second image used for configuring the stereo image using only a correlation relation with respect to the first image.

In case of using the joint method, the image provide apparatus encodes a first image used for configuring a stereo image using a 2D image compression technology. After that, the image provide apparatus encodes a second image using the first image depending on an image characteristic of the second image used for configuring the stereo image, or encodes the second image using a 2D image compression technology separately from the first image.

As described above, in case of compressing a stereo image using a 2D image compression technology, complexity for compressing the stereo image at the image provide apparatus increases much.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing complexity caused by stereo image compression in an image provide apparatus that provides a stereo image.

Another aspect of the present invention is to provide an apparatus and a method for compressing an image by reducing image quality of one of images configuring a stereo image in an image provide apparatus that provides a stereo image.

Still another aspect of the present invention is to provide an apparatus and a method for compressing an image by reducing image quality of one of images configuring a stereo image every frame in an image provide apparatus that provides a stereo image.

Yet another aspect of the present invention is to provide an apparatus and a method for reducing complexity caused by stereo image compression in a mobile terminal that provides a stereo image.

Still yet another aspect of the present invention is to provide an apparatus and a method for compressing an image by reducing image quality of one of images configuring a stereo image in a mobile terminal that provides a stereo image.

Further yet another aspect of the present invention is to provide an apparatus and a method for compressing an image by reducing image quality of one of images configuring a stereo image every frame in a mobile terminal that provides a stereo image.

In accordance with an aspect of the present invention, a method for processing a stereo image is provided. The method includes obtaining a first image and a second image used for configuring a stereo image via at least two camera modules installed separated by a predetermine distance, when capturing a stereo image, alternatively sampling the first image and the second image with a predetermined time interval, encoding the sampled first image and the sampled second image, and storing the encoded first image and the encoded second image.

In accordance with another aspect of the present invention, an apparatus for processing a stereo image is provided. The apparatus includes a stereo camera including at least two camera modules installed separated by a predetermine distance, an image processor for synthesizing a first image and a second image obtained via the cameras to generate a stereo image, alternatively sampling the first image and the second image with a predetermined time interval, and encoding the sampled first image and second image, a display unit for displaying the stereo image generated by the image processor, and a storage for storing the first image and the second image encoded by the image processor.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technology for compressing a stereo image in an image provide apparatus that provides a stereo image.

Though it is assumed that a mobile terminal compresses a stereo image in the following description, other image provide apparatuses that provide a stereo image may compress a stereo image in the same manner.

In the case where a mobile terminal provides a stereo image, the mobile terminal captures a first image and a second image used for generating a stereo image using a stereo camera including two camera modules. At this point, the mobile terminal samples the first image and the second image as illustrated in FIG. 1 in order to reduce complexity caused by stereo image compression. In the following description, a sampling technique illustrated in FIG. 1 is denoted by alternative frame sampling.

Figure 1A:
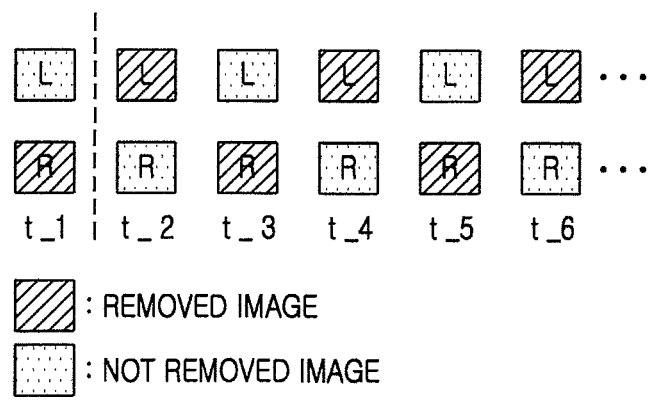
FIGS. 1A and 1B are a view illustrating an alternative sampling for a stereo image according to an exemplary embodiment of the present invention.
Figure 1B:

FIGS. 1A and 1B are a view illustrating an alternative sampling for a stereo image according to an exemplary embodiment of the present invention.

Referring to FIG. 1, FIG. 1A illustrates an image removed via alternative frame sampling, and FIG. 1B illustrates a frame sequence transmitted to an image coder after the alternative frame sampling.

A mobile terminal captures the same spot at the same point of time using two camera modules separated by a predetermined distance to obtain a first image and a second image. After that, the mobile terminal synthesizes the first image and the second image containing similar image information to generate a stereo image.

Accordingly, as illustrated in FIG. 1A, the mobile terminal performs alternative frame sampling that samples one of the first image and the second image captured at the same point. At this point, the mobile terminal alternatively and sequentially removes the first image and the second image so that the first image and the second image are not successively sampled. For example, in the case where the mobile terminal removes a second image R captured using a second camera module at a frame of a point $t\_1$, the mobile terminal removes a first image L captured using a first camera module at a frame of a point $t\_2$. After that, the mobile terminal removes a second image R captured using the second camera module at a frame of a point $t\_3$.

As described above, in the case where the mobile terminal performs the alternative frame sampling on the first image and the second image, the mobile terminal transmits a frame sequence illustrated in FIG. 1B to an image coder to compress the same.

Hereinafter, the construction of a mobile terminal for compressing a stereo image is described.

Figure 2:
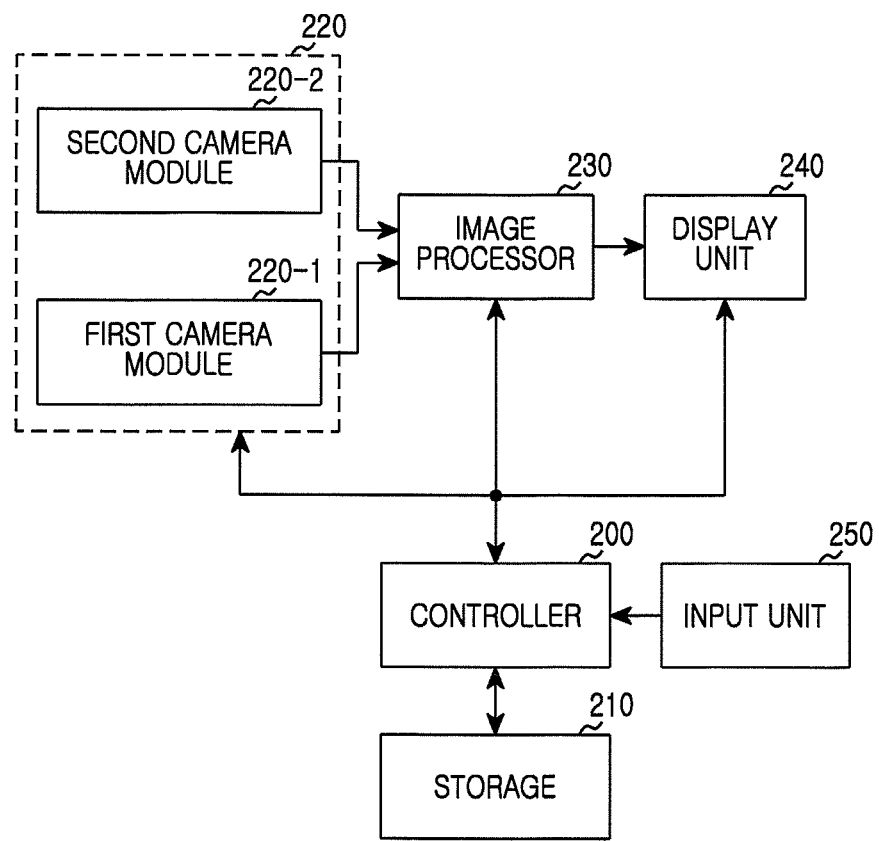
FIG. 2 is a block diagram illustrating a mobile terminal according to an exemplary embodiment of the present invention.

FIG. 2 is a block diagram illustrating a mobile terminal according to an exemplary embodiment of the present invention.

As illustrated in FIG. 2, the mobile terminal includes a controller 200, a storage 210, a stereo camera 220, an image processor 230, a display unit 240, and an input unit 250.

The controller 200 controls an overall operation of the mobile terminal. For example, the controller 200 controls the stereo camera 220 and the image processor 230 to generate a stereo image. At this point, before compressing a stereo image, the controller 200 controls the image processor 230 to perform alternative frame sampling on the first image and the second image used for configuring the stereo image.

The storage 210 stores a program for controlling an overall operation of the mobile terminal, temporary data occurring during an operation of the mobile terminal, system parameters, and data for storage. For example, the storage 210 stores a stereo image encoded by the image processor 230 under control of the controller 200. At this point, the storage 210 stores the first image captured by a first camera module 220-1 and the second image captured by a second camera module 220-2 in an image information region under control of the controller 200. Here, the storage 210 stores the encoded first image and second image.

The stereo camera 220 includes the first camera module 220-1 and the second camera module 220-2. At this point, the stereo camera 220 separates the first camera module 220-1 and the second camera module 220-2 by a predetermined distance or more to capture an object similar to an image viewed by both eyes of a person.

The image processor 230 generates a stereo image using images obtained from the stereo camera 220. For example, the image processor 230 synthesizes the first image captured by the first camera module 220-1 and the second image captured by the second camera module 220-2 to generate a stereo image. For another example, the image processor 230 recovers and synthesizes encoded first image and second image stored in the storage 210 to generate a stereo image.

In addition, when capturing a stereo image under control of the controller 200, the image processor 230 performs alternative frame sampling on the first image and the second image, and encodes the sampled first image and second image. At this point, the image processor 230 may control a sampling interval depending on the characteristics of the first image and the second image. That is, when performing the alternative frame sampling, the image processor 230 alternatively samples the first image and the second image on a frame basis but may control a sampling interval depending on the characteristics of the first image and the second image.

The display unit 240 displays state information occurring during an operation of the mobile terminal, characters input by a user, moving pictures, still pictures, etc. under control of the controller 200. For example, the display unit 240 displays a stereo image provided from the image processor 230.

The input unit 250 provides data corresponding to the user's input to the controller 200.

The image processor for generating a stereo image in the mobile terminal configured as described above is configured as illustrated in FIG. 3.

Figure 3:
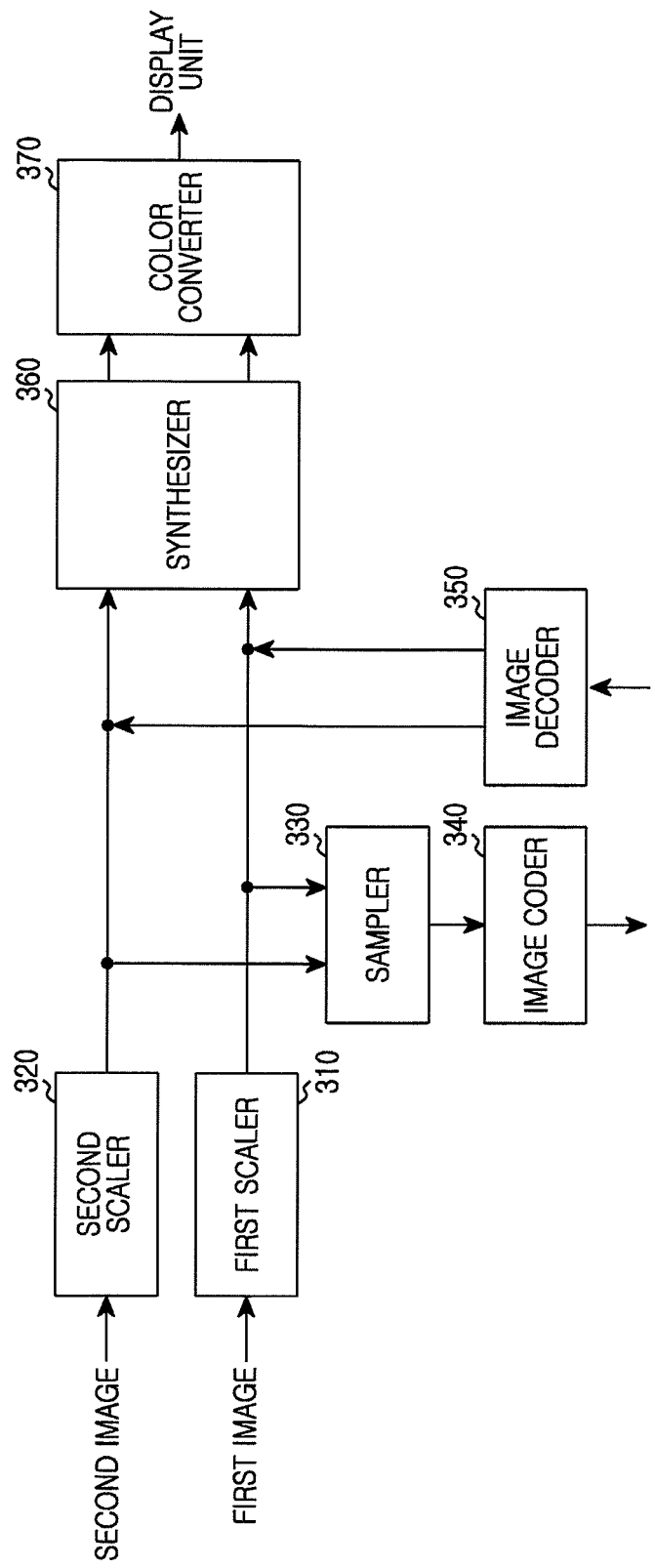
FIG. 3 is a block diagram illustrating an image processor forming a mobile terminal according to an exemplary embodiment of the present invention.

FIG. 3 is a block diagram illustrating an image processor forming a mobile terminal according to an exemplary embodiment of the present invention.

As illustrated in FIG. 3, the image processor 230 includes a first scaler 310, a second scaler 320, a sampler 330, an image coder 340, an image decoder 350, a synthesizer 360, and a color converter 370.

The first scaler 310 scales the first image captured by the first camera module 220-1 to an image size that can be displayed on the display unit 240.

The second scaler 320 scales the second image captured by the second camera module 220-2 to an image size that can be displayed on the display unit 240.

The sampler 330 performs alternative sampling on the scaled first image provided from the first scaler 310 and the scaled second image provided from the second scaler 320 via an alternative frame sampling technique. For example, the sampler 330 removes one of the first image and the second image on a frame basis as illustrated in FIG. 1A. At this point, the sampler 330 alternatively and sequentially removes the first image and the second image so that the first image and the second image are not successively sampled. Here, the sampler 330 performs the alternative frame sampling on a frame basis, but may control a sampling interval depending on the characteristics of the first image and the second image.

The image coder 340 encodes the sampled first image and second image provided from the sampler 330. For example, in the case where the sampler 330 performs the alternative frame sampling on a frame basis, the image coder 340 encodes the frame sequence illustrated in FIG. 1B provided from the sampler 330.

At this point, the image coder 340 may include a Decode Picture Buffer (DPB) using motion prediction as in an image coder of a Moving Picture Experts Group (MPEG) series. At this point, the image coder 340 swaps left and right images of a frame using two DPBs.

The image decoder 350 decodes and recovers an encoded stereo image stored in the storage 210 in order to display a stereo image stored in the storage 210 under control of the controller 200.

At this point, the image decoder 350 may be divided into a decoding unit and a recovering unit.

The decoding unit 210 decodes encoded first image and second image stored in the storage 210.

Figure 7:
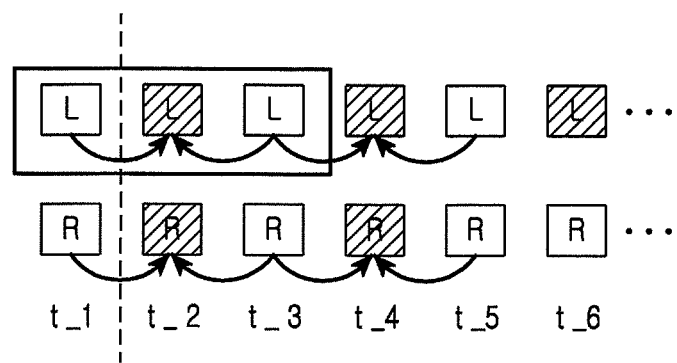
FIG. 7 is a view illustrating a construction for recovering a switched sampled image according to an exemplary embodiment of the present invention.

The recovering unit recovers sampled portions of the first image and the second image decoded by the decoding unit using an interpolation method. A stereo image may allow a difference between the first image and the second image captured at the same time to show a 3D effect. Accordingly, the recovering unit recovers a removed image using an image of a frame right before the image removed via sampling and an image of a frame right after the image. For example, in the case where the alternative frame sampling has been performed on the first image and the second image as illustrated in FIG. 1A, the recovering unit recovers the sampled first image and second image using interpolation as illustrated in FIG. 7. That is, the recovering unit recovers a first image L of a point $t\_2$ using an average of pixels on the same position in a first image L of a point $t\_1$ and a first image L of a point $t\_3$. In addition, the recovering unit recovers a second image R of a point $t\_3$ using an average of pixels on the same position in a second image R of a point $t\_2$ and a second image R of a point $t\_4$.

The synthesizer 360 synthesizes a first image provided from the first scaler 310 and a second image provided from the second scaler 320 to generate a stereo image.

In addition, the synthesizer 360 may synthesize a first image and a second image provided from the image decoder 350 to generate a stereo image. In this case, one of the first image and the second image of the same point provided from the image decoder 350 has a poor image quality which has been generated using interpolation. However, when the synthesizer 360 synthesizes the first image and the second image, an image of a fine image quality complements an image of a poor image quality, so that an image quality on the whole when viewed in a stereo screen is not deteriorated.

The color converter 370 converts a stereo image generated by the synthesizer 360 into colors supported by the display unit 240 and outputs the same on the display unit 240.

Hereinafter, a method for compressing a stereo image in a mobile terminal is described.

Figure 4:
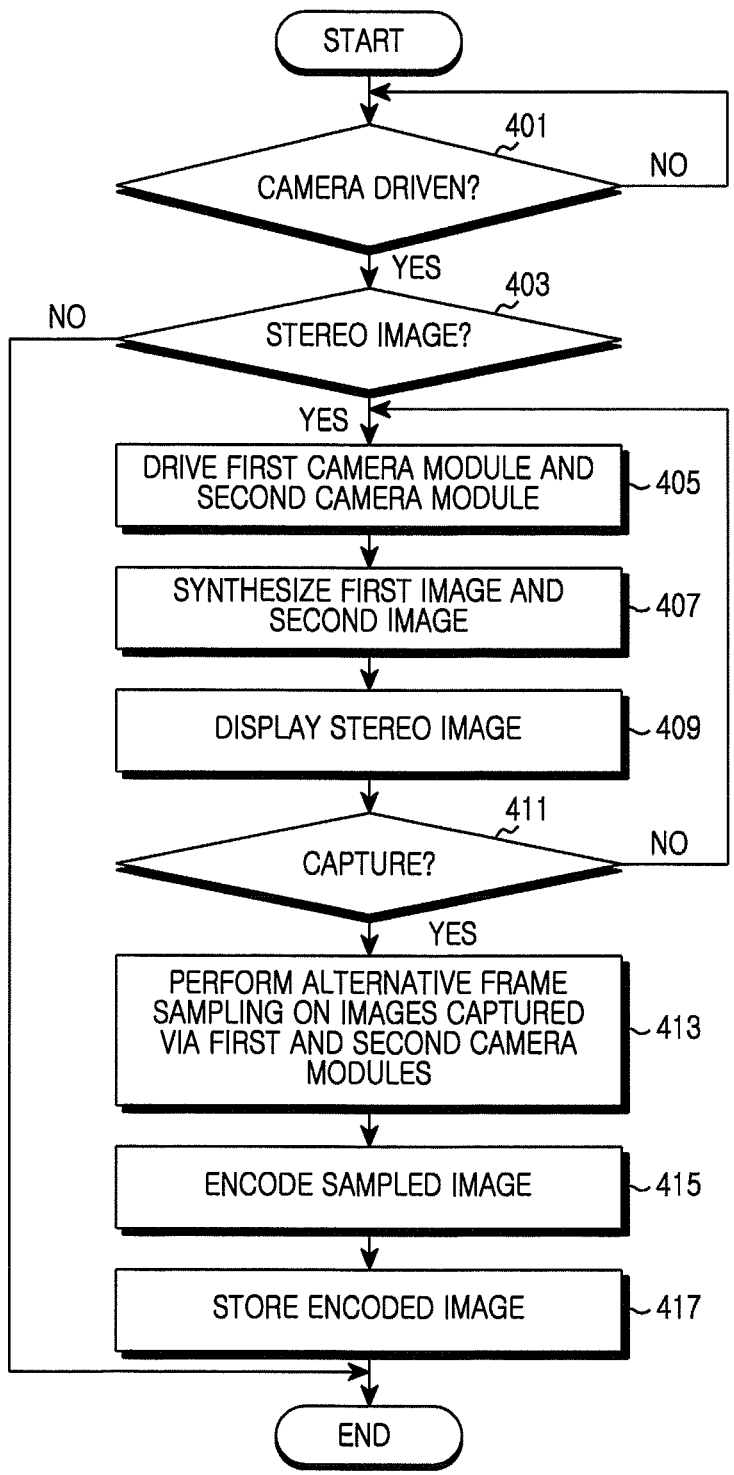
FIG. 4 is a flowchart illustrating a procedure for storing a stereo image in a mobile terminal according to an exemplary embodiment of the present invention.

FIG. 4 is a flowchart illustrating a procedure for storing a stereo image in a mobile terminal according to an exemplary embodiment of the present invention.

Referring to FIG. 4, the mobile terminal determines whether a camera is driven in step 401. For example, the mobile terminal determines whether a camera mode is executed by a user's manipulation or a program and a camera is driven.

When the camera is driven, the mobile terminal proceeds to step 403 to determine whether the camera mode driven in step 401 is a camera mode for processing a stereo image.

When the camera mode driven in step 401 is not the camera mode for processing a stereo image, the mobile terminal ends the present algorithm. At this point, the mobile terminal may capture and store a 2D image using only one of camera modules included in the stereo camera 220 of FIG. 2.

In contrast, when the camera mode driven in step 401 is the camera mode for processing a stereo image, the mobile terminal proceeds to step 405 to drive both a first camera module and a second camera module included in the stereo camera.

The mobile terminal proceeds to step 407 to synthesize a first image and a second image obtained via the first camera module and the second camera module at the same point to generate a stereo image.

After generating the stereo image, the mobile terminal proceeds to step 409 to display the stereo image generated in step 407 on the display unit 240.

The mobile terminal determines whether a stereo image capture mode is executed by a user's manipulation in step 411.

When the stereo image capture mode is not executed, the mobile terminal proceeds to step 407 to synthesize the first image and the second image obtained via the first camera module and the second camera module at the same point to generate a stereo image.

In contrast, when the stereo image capture mode is executed, the mobile terminal proceeds to step 413 to perform alternative frame sampling on the first image and the second image via an alternative frame sampling technique. For example, the mobile terminal removes one of the first image and the second image on a frame basis as illustrated in FIG. 1A. At this point, the mobile terminal alternatively and sequentially removes the first image and the second image so that the first image and the second image are not successively sampled. For example, in the case where the mobile terminal removes a second image R captured using a second camera module at a frame of a point t_1, the mobile terminal removes a first image L captured using a first camera module at a frame of a point t_2. After that, the mobile terminal removes a second image R captured using the second camera module at a frame of a point t_3. Here, though the mobile terminal performs the alternative frame sampling on a frame basis, the mobile terminal may control a sampling interval depending on the characteristics of the first image and the second image.

After performing the alternative frame sampling on the first image and the second image, the mobile terminal proceeds to step 415 to encode the sampled first image and second image. For example, in case of performing the alternative frame sampling on the first image and the second image on a frame basis, the mobile terminal encodes a frame sequence configured as in FIG. 1B.

After encoding the sampled first image and second image, the mobile terminal proceeds to step 417 to store the encoded first image and second image in the storage 210.

After that, the mobile terminal ends the present algorithm.

Though not shown in the above embodiments, in case of capturing a stereo image, the mobile terminal synthesizes a first image and a second image on which the sampling has not been performed while the mobile terminal performs the sampling and encoding on the first image and the second image in order to compress the stereo image, and continuously displays the synthesized image on the display 240. That is, the mobile terminal displays the stereo image on the display unit 240 while the mobile terminal compresses the stereo image so that the user may view it.

Figure 5:
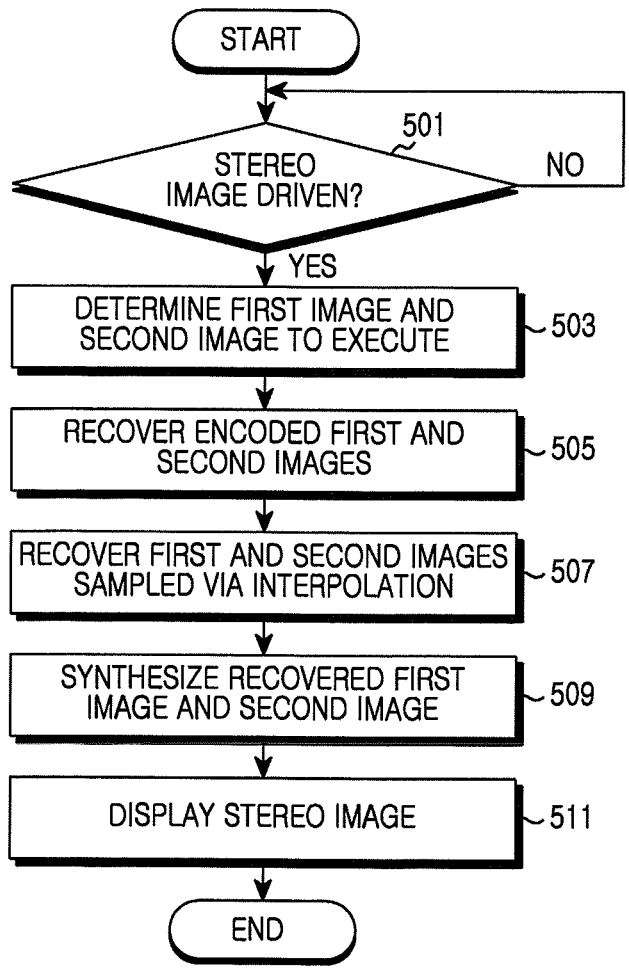
FIG. 5 is a flowchart illustrating a procedure for executing a stereo image in a mobile terminal according to an exemplary embodiment of the present invention.

When executing the compressed and stored stereo image as described above, the mobile terminal recovers the stored stereo image as illustrated in FIG. 5.

FIG. 5 is a flowchart illustrating a procedure for executing a stereo image in a mobile terminal according to an exemplary embodiment of the present invention.

Referring to FIG. 5, the mobile terminal determines whether to execute a compressed and stored stereo image in step 501. For example, the mobile terminal determines whether a stereo image drive mode is selected by a user's manipulation or a program.

When executing a stereo image, the mobile terminal proceeds to step 503 to determine and extract a stereo image to execute among compressed and stored stereo images. For example, the mobile terminal extracts first images and second images to be used for generating a stereo image among encoded and stored first images and second images.

The mobile terminal proceeds to step 505 to decode the extracted first images and second images.

After decoding the first images and second images, the mobile terminal proceeds to step 507 to recover sampled portions of the first images and the second images using an interpolation method. For example, when the alternative frame sampling has been performed on the first image and the second image as illustrated in FIG. 1A, the mobile terminal recovers the sampled first image and second image using the interpolation method as illustrated in FIG. 7. That is, the mobile terminal recovers a first image L of a point t_2 using an average of pixels on the same position in a first image L of a point t_1 and a first image L of a point t_3. In addition, the mobile terminal recovers a second image R of a point t_3 using an average of pixels on the same position in a second image R of a point t_2 and a second image R of a point t_4.

After recovering the sampled portions of the first image and the second image, the mobile terminal proceeds to step 509 to synthesize the recovered first image and second image and generate a stereo image.

After generating the stereo image, the mobile terminal proceeds to step 511 to display the stereo image generated in step 509 on the display unit 240.

After that, the mobile terminal ends the present algorithm.

Figure 6:
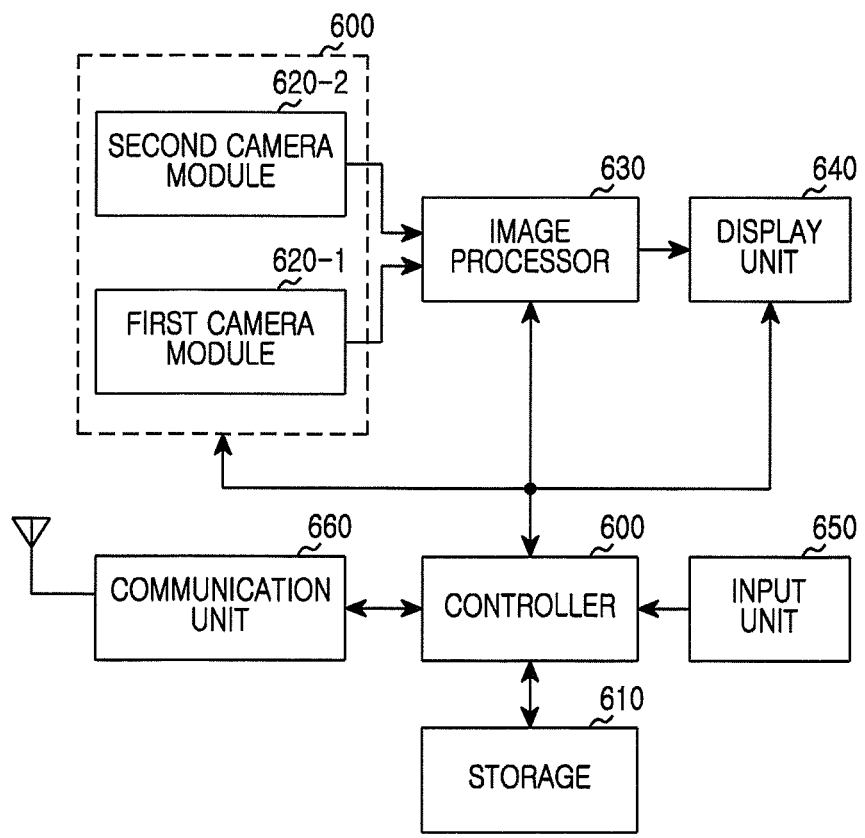
FIG. 6 is a block diagram illustrating a mobile terminal that can communicate according to an exemplary embodiment of the present invention.

In the case where the mobile terminal performs wireless communication, the mobile terminal may be configured as illustrated in FIG. 6.

FIG. 6 is a block diagram illustrating a mobile terminal that can communicate according to an exemplary embodiment of the present invention.

As illustrated in FIG. 6, the mobile terminal includes a controller 600, a storage 610, a stereo camera 620, an image processor 630, a display unit 640, an input unit 650, and a communication module 60.

The controller 600 controls an overall operation of the mobile terminal. For example, the controller 600 controls the stereo camera 620 and the image processor 630 to generate a stereo image. At this point, before compressing a stereo image, the controller 600 controls the image processor 630 to perform alternative frame sampling on a first image and a second image used for configuring the stereo image.

The storage 610 stores a program for controlling an overall operation of the mobile terminal, temporary data occurring during an operation of the mobile terminal, system parameters, and other data for storage. For example, the storage 610 stores a stereo image encoded by the image processor 630 under control of the controller 600. At this point, the storage 610 stores a first image captured by a first camera module 620-1 and a second image captured by a second camera module 620-2 in an image information region under control of the controller 600. Here, the storage stores encoded first image and second image.

The stereo camera 620 includes the first camera module 620-1 and the second camera module 620-2. At this point, the stereo camera 620 separates the first camera module 620-1 and the second camera module 620-2 by a predetermined distance or more to capture an object similar to an image viewed by both eyes of a person.

The image processor 630 generates a stereo image using images obtained from the stereo camera 620. For example, the image processor 630 synthesizes a first image captured by the first camera module 620-1 and a second image captured by the second camera module 620-2 to generate a stereo image. For another example, the image processor 630 may recover and synthesize encoded first image and second image stored in the storage 610 to generate a stereo image.

In addition, in case of capturing a stereo image under control of the controller 600, the image processor 630 performs alternative frame sampling on a first image and a second image, and encodes the sampled first image and second image. At this point, the image processor 630 may control a sampling interval depending on the characteristics of the first image and the second image. That is, in case of performing alternative frame sampling, the image processor 630 performs alternative frame sampling on the first image and the second image, but may control the sampling interval depending on the characteristics of the first image and the second image.

The display unit 640 displays state information occurring during an operation of the mobile terminal, characters input by a user, moving pictures, still pictures, etc. under control of the controller 600. For example, the display unit 640 displays a stereo image provided from the image processor 630.

The input unit 650 provides data corresponding to the user's input to the controller 600.

The communication module 660 processes a Radio Frequency (RF) signal transmitted/received via an antenna.

In the above embodiments, the mobile terminal alternatively removes one of a first image and a second image used for generating a stereo image every frame via alternative frame sampling.

In other embodiments, the mobile terminal may alternatively reduce an image quality of one of a first image and a second image used for generating a stereo image every frame via alternative frame sampling.

As described above, an image provide apparatus for providing a stereo image has an advantage of compressing a stereo image with low complexity compared to the case of compressing a stereo image using a 2D image compression technology by reducing an image quality of one of images configuring a stereo image every frame and compressing the same.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method to process a stereo image, the method comprising:
    obtaining a first image and a second image using at least two camera modules, wherein the first image and the second image are used to configure a stereo image, and wherein the at least two camera modules are separated by a predetermined distance;
    alternatively sampling the first image and the second image by a predetermined time interval;
    encoding the sampled first image and the sampled second image; and
    storing the encoded first image and the encoded second image, wherein the sampling of the first image and the second image comprises alternatively and sequentially removing one of the first image and the second image by a predetermined time interval.

2. The method of claim 1, wherein the predetermined time interval is controlled depending on characteristics of the first image and the second image.

3. The method of claim 1, wherein the predetermined time interval comprises a frame.

4. The method of claim 1, further comprising:
    after obtaining the first image and the second image and prior to sampling the first image and the second image, synthesizing the first image and the second image to generate a stereo image; and
    displaying the stereo image on a display unit.

5. The method of claim 1, further comprising:
    synthesizing the first image and the second image to generate a stereo image while sampling and encoding the first image and the second image; and
    displaying the stereo image on a display unit.

6. The method of claim 1, wherein encoding comprises encoding one sequence comprising the sampled first image and second image.

7. The method of claim 1, further comprising:
    after storing the encoded first image and the encoded second image, determining at least one encoded first image and at least one encoded second image used to generate a stereo image among the stored encoded first image and the encoded second image;
    decoding the determined encoded first image and the encoded second image;
    recovering portions removed from the decoded first image and second image via sampling using an interpolation method;
    synthesizing the recovered first image and second image to generate a stereo image; and
    displaying the stereo image on a display unit.

8. An apparatus to process a stereo image, the apparatus comprising:
    a stereo camera comprising at least two camera modules separated by a predetermined distance;
    an image processor configured to:
        obtain a first image and a second image using the at least two cameras, wherein the first image and the second image are used to configure a stereo image,
        alternatively sampling the first image and the second image by a predetermined time interval, and
        encode the sampled first image and the second image;
    a display unit configured to display the stereo image generated by the image processor; and
    a storage configured to store the encoded first image and the encoded second image encoded by the image processor, wherein the image processor is configured to alternatively and sequentially remove one of the first image and second image by a predetermined time interval.

9. The apparatus of claim 8, wherein the image processor comprises:
    a sampler configured to perform alternating sampling of the first image and the second image with the predetermined time interval; and
    an image coder configured to encode the first image and the second image sampled by the sampler.

10. The apparatus of claim 9, wherein the sampler is configured to control the time interval with which the sampler performs the alternative sampling depending on characteristics of the first image and the second image.

11. The apparatus of claim 9, wherein the sampler is configured to alternatively and sequentially remove one of the first image and the second image on a frame basis.

12. The apparatus of claim 9, wherein the image coder comprises two Decode Picture Buffers (DPBs) configured to use motion prediction in an image coder of a Moving Picture Experts Group (MPEG) series.

13. The apparatus of claim 9, wherein the image processor further comprises a synthesizer configured to:
    synthesize the first image and the second image obtained via the camera to generate a stereo image separately from sampling and encoding of the first image and the second image at the sampler and the image coder.

14. The apparatus of claim 13, wherein the image processor further comprises a scaler configured to scale the first image and the second image obtained via the camera into an image size displayable by the display unit and transmit the scaled first image and second image to at least one of the synthesizer and the sampler.

15. The apparatus of claim 13, wherein the image processor further comprises a color converter configured to convert the stereo image generated by the synthesizer to colors supported by the display unit.

16. The apparatus of claim 8, wherein the image decoder comprises:
   a decoding unit configured to determine and decode at least one encoded first image and at least one encoded second image used for configuring a stereo image among the encoded first images and the encoded second images stored in the storage; and
   a recovering unit configured to recover portions removed via sampling from the first image and the second image decoded by the decoding unit using an interpolation method.

17. The apparatus of claim 8, wherein the image processor comprises a synthesizer configured to synthesize the first image and the second image recovered and decoded by the image decoder to generate a stereo image.

18. A method to process a stereo image, the method comprising:
   obtaining a first image and a second image using at least two camera modules, wherein the first image and the second image are to configure a stereo image, and wherein the at least two camera modules are separated by a predetermine distance;
   alternatively sampling the first image and the second image by a predetermined time interval;
   encoding the sampled first image and the sampled second image; and
   storing the encoded first image and the encoded second image,
   wherein sampling the first image and the second image comprises:
      alternatively and sequentially reducing an image quality of one of the first image and the second image by the predetermined time interval.

19. An apparatus to process a stereo image, the apparatus comprising:
   a stereo camera comprising at least two camera modules separated by a predetermined distance;
   an image processor configured to:
      obtain a first image and a second image using the at least two cameras, wherein the first image and the second image are used to configure a stereo image,
      alternatively sample the first image and the second image by a predetermined time interval, and
      encode the sampled first image and second image;
   a display unit configured to display the stereo image generated by the image processor; and
   a storage configured to store the first image and the second image encoded by the image processor,
   wherein the image processor is configured to alternatively and sequentially reduce an image quality of one of the first image and the second image by the predetermined time interval.

* * * * *